US012745237B2

(12) United States Patent
Wei et al.

(10) Patent No.: US 12,745,237 B2
(45) Date of Patent: Sep. 22, 2026

(54) TRANSMISSIONS ACROSS MULTIPLE TIME-DOMAIN RESOURCES IN WIRELESS COMMUNICATION NETWORKS

(71) Applicant: ZTE CORPORATION, Shenzhen (CN)

(72) Inventors: Xingguang Wei, Shenzhen (CN); Xianghui Han, Shenzhen (CN); Junfeng Zhang, Shenzhen (CN); Jian Li, Shenzhen (CN); Jing Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 351 days.

(21) Appl. No.: 18/506,772

(22) Filed: Nov. 10, 2023

(65) Prior Publication Data

US 2024/0121774 A1 Apr. 11, 2024

Related U.S. Application Data

(63) Continuation of application No. PCT/CN2022/079580, filed on Mar. 7, 2022.

(51) Int. Cl.
*H04W 72/1263* (2023.01)
*H04L 5/00* (2006.01)
*H04W 72/51* (2023.01)

(52) U.S. Cl.
CPC ....... *H04W 72/1263* (2013.01); *H04L 5/0012* (2013.01); *H04W 72/51* (2023.01)

(58) Field of Classification Search
CPC . H04W 72/00; H04W 72/12; H04W 72/1268; H04W 72/02; H04W 72/20;
(Continued)

(56) References Cited

U.S. PATENT DOCUMENTS 10,932,255 B2 * 2/2021 Xue ...................... H04W 72/21
2020/0084773 A1 * 3/2020 Li ..................... H04W 72/0453
(Continued)

FOREIGN PATENT DOCUMENTS

CN 109923824 A 6/2019
CN 112954796 A 6/2021
(Continued)

OTHER PUBLICATIONS

International Search Report and Written Opinion for PCT Appl. No. PCT/CN2022/079580, mailed on Nov. 28, 2022 (6 pages).
(Continued)

*Primary Examiner* — Warner Wong
(74) *Attorney, Agent, or Firm* — Foley & Lardner LLP

(57) ABSTRACT

The present disclosure relates to managing transmissions across multiple time-domain resources, including receiving, by a User Equipment (UE) from a network, one or more of at least one frequency-domain starting position for a transmission, at least one frequency resource set for the transmission, or at least one frequency hopping configuration set for the transmission. The UE determines a plurality of time-domain resources for repeating the transmission or for multiple transmissions scheduled by a same scheduling command. The UE determines at least one of a frequency-domain starting position, a frequency-domain resource set, or a frequency hopping configuration set for the transmission in each of the plurality of time-domain resources.

6 Claims, 9 Drawing Sheets

(58) Field of Classification Search

CPC ..... H04W 72/50; H04W 72/51; H04W 28/00; H04W 74/00; H04W 74/04; H04W 74/0446; H04W 74/045; H04L 5/00; H04L 5/0001; H04L 5/0003; H04L 5/0005; H04L 5/0007; H04L 1/08; H04L 1/18; H04L 1/1816; H04L 1/189

See application file for complete search history.

(56) References Cited

U.S. PATENT DOCUMENTS

| | | | | |
|---|---|---|---|---|
| 2021/0136827 | A1 | 5/2021 | Xiong et al. | |
| 2023/0048695 | A1 | 2/2023 | Kim et al. | |
| 2023/0156727 | A1* | 5/2023 | Sengupta | H04W 72/23 370/329 |
| 2024/0048299 | A1* | 2/2024 | Sridharan | H04W 72/02 |
| 2024/0314848 | A1* | 9/2024 | Xiong | H04W 56/001 |
| 2025/0063554 | A1* | 2/2025 | Li | H04W 72/0453 |

FOREIGN PATENT DOCUMENTS

| | | | | |
|---|---|---|---|---|
| CN | 113785644 | A | 12/2021 | |
| CN | 114095058 | A | 2/2022 | |
| KR | 10-2020-0141992 | A | 12/2020 | |
| KR | 10-2021-0095430 | A | 8/2021 | |
| WO | WO-2018171793 | A1 * | 9/2018 | H04W 72/04 |
| WO | WO-2019/216586 | A1 | 11/2019 | |
| WO | WO-2021/034700 | A1 | 2/2021 | |
| WO | WO-2021/188893 | A1 | 9/2021 | |
| WO | WO-2022040995 | A1 * | 3/2022 | H04W 74/08 |
| WO | WO-2025167520 | A1 * | 8/2025 | H04L 5/00 |

OTHER PUBLICATIONS

Extended European Search Report for EP Appl. No. 22930211.2, dated Mar. 5, 2025 (12 pages).

Notice of Submission of Opinion on KR Appl. No. 10-2024-7027643 dated Mar. 13, 2026 (12 pages).

* cited by examiner

| Index | Set of Frequency Hopping Configurations |
| --- | --- |
| 0 | $O_0 = 40, O_1 = 90$ |
| 1 | $O_0 = 30, O_1 = 90$ |
| 2 | $O_0 = 20, O_1 = 80$ |
| 3 | $O_0 = 20, O_1 = 60$ |

1000

| Index | Set of Frequency Hopping Configuration |
| --- | --- |
| 0 | 1st pair: $O1_0 = 0, O2_0 = 40$;<br>2nd pair: $O1_1 = 0, O2_1 = 90$; |
| 1 | 1st pair: $O1_0 = 10, O2_0 = 40$;<br>2nd pair: $O1_1 = 10, O2_1 = 90$; |
| 2 | 1st pair: $O1_0 = 20, O2_0 = 40$;<br>2nd pair: $O1_1 = 20, O2_1 = 90$; |
| 3 | 1st pair: $O1_0 = 10, O2_0 = 20$;<br>2nd pair: $O1_1 = 10, O2_1 = 60$; |

TRANSMISSIONS ACROSS MULTIPLE TIME-DOMAIN RESOURCES IN WIRELESS COMMUNICATION NETWORKS

CROSS-REFERENCE TO RELATED APPLICATION

This application claims the benefit of priority under 35 U.S.C. § 120 as a continuation of PCT Patent Application No. PCT/CN2022/079580, filed on Mar. 7, 2022, the disclosure of which is incorporated herein by reference in its entirety.

TECHNICAL FIELD

The disclosure relates generally to wireless communications and, more particularly, to systems, methods, and non-transitory computer-readable media for transmissions across multiple time-domain resources.

BACKGROUND

Various types of transmissions are across multiple slots or sub-slots, including Physical Downlink Shared Channel (PDSCH) repetition, Physical Uplink Shared Channel (PUSCH) repetition, Physical Uplink Control Channel (PUCCH) repetition, one Downlink Control Information (DCI) scheduling multiple PDSCHs or PUSCHs, and so on. Without frequency hopping, all repetition transmissions or transmissions scheduled by one DCI are transmitted in different slots or sub-slots of the same frequency resource. With frequency hopping, a hopping pattern is configured for transmitting repetition transmissions or transmissions scheduled by one DCI.

SUMMARY

The example arrangements relate to managing transmissions across multiple time-domain resources, including receiving, by a User Equipment (UE) from a network, one or more of at least one frequency-domain starting position for a transmission, at least one frequency resource set for the transmission, or at least one frequency hopping configuration set for the transmission. The frequency resource set can herein be referred to also as frequency-domain resource set. The UE determines a plurality of time-domain resources for repeating the transmission or for multiple transmissions scheduled by a same scheduling command. The UE determines at least one of a frequency-domain starting position, a frequency-domain resource set, or a frequency hopping configuration set for the transmission in each of the plurality of time-domain resources.

The above and other aspects and their arrangements are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

For mobile communication networks that support flexible time-frequency resource allocation for downlink and uplink (e.g., full duplex transmission systems), the frequency resource allowed for downlink and uplink can be different in each time-domain resource (e.g., slot, sub-slot, sub-frame, frame, or another suitable resource in the time-domain). The arrangements disclosed herein allow indication of frequency resources for downlink and uplink transmissions in different time-domain resources, for transmissions across multiple time-domain resources where different time-domain resources correspond to different frequency resources allowed for downlink and uplink. Frequency resources not allowed for a transmission cannot be indicated for a transmission.

Figure 1:
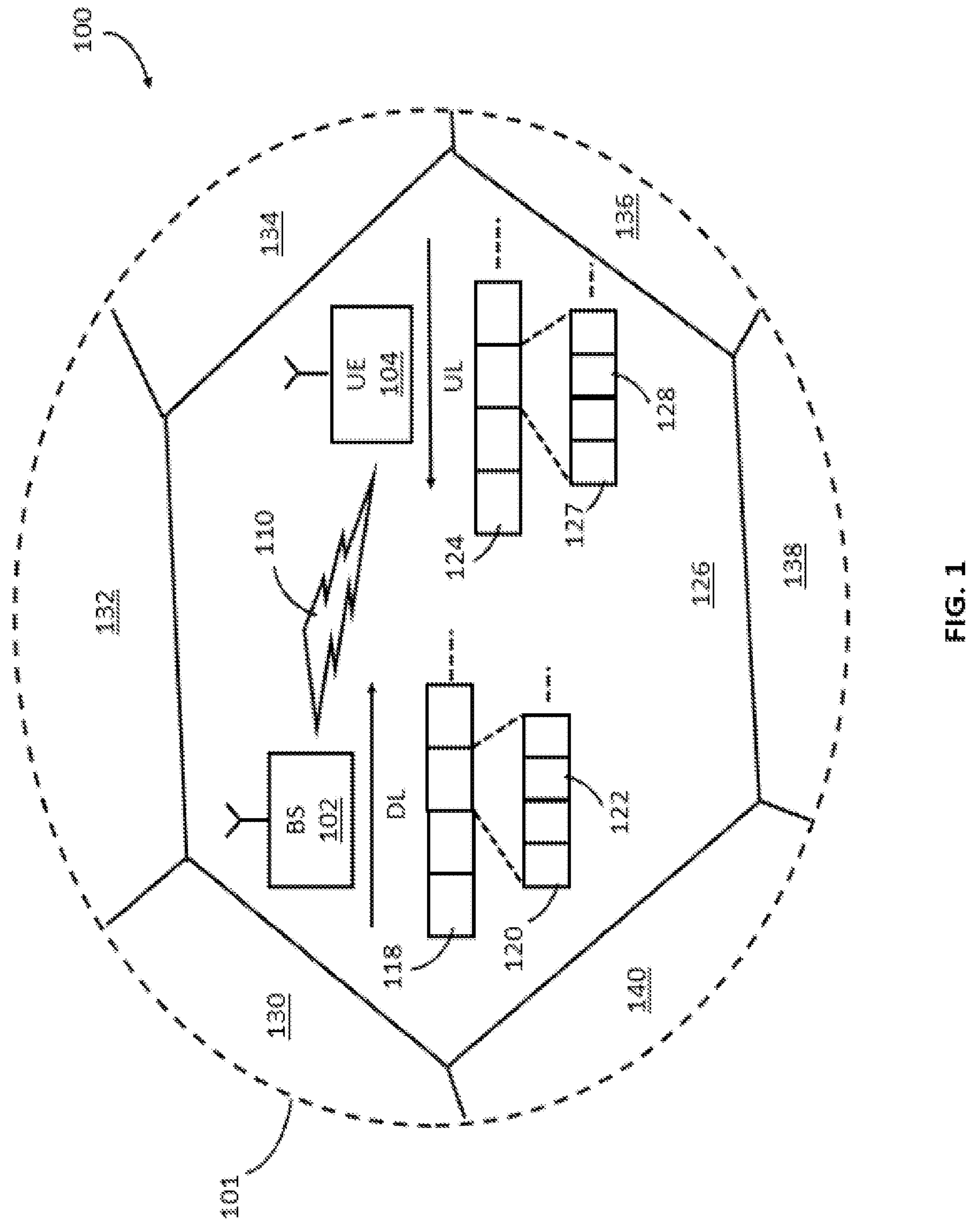
FIG. 1 illustrates an example wireless communication network, and/or system, in which techniques disclosed herein may be implemented, in accordance with some arrangements.

FIG. 1 illustrates an example wireless communication network, and/or system, 100 in which techniques disclosed herein may be implemented, in accordance with an arrangement of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a UE device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various arrangements of the present solution.

Figure 2:
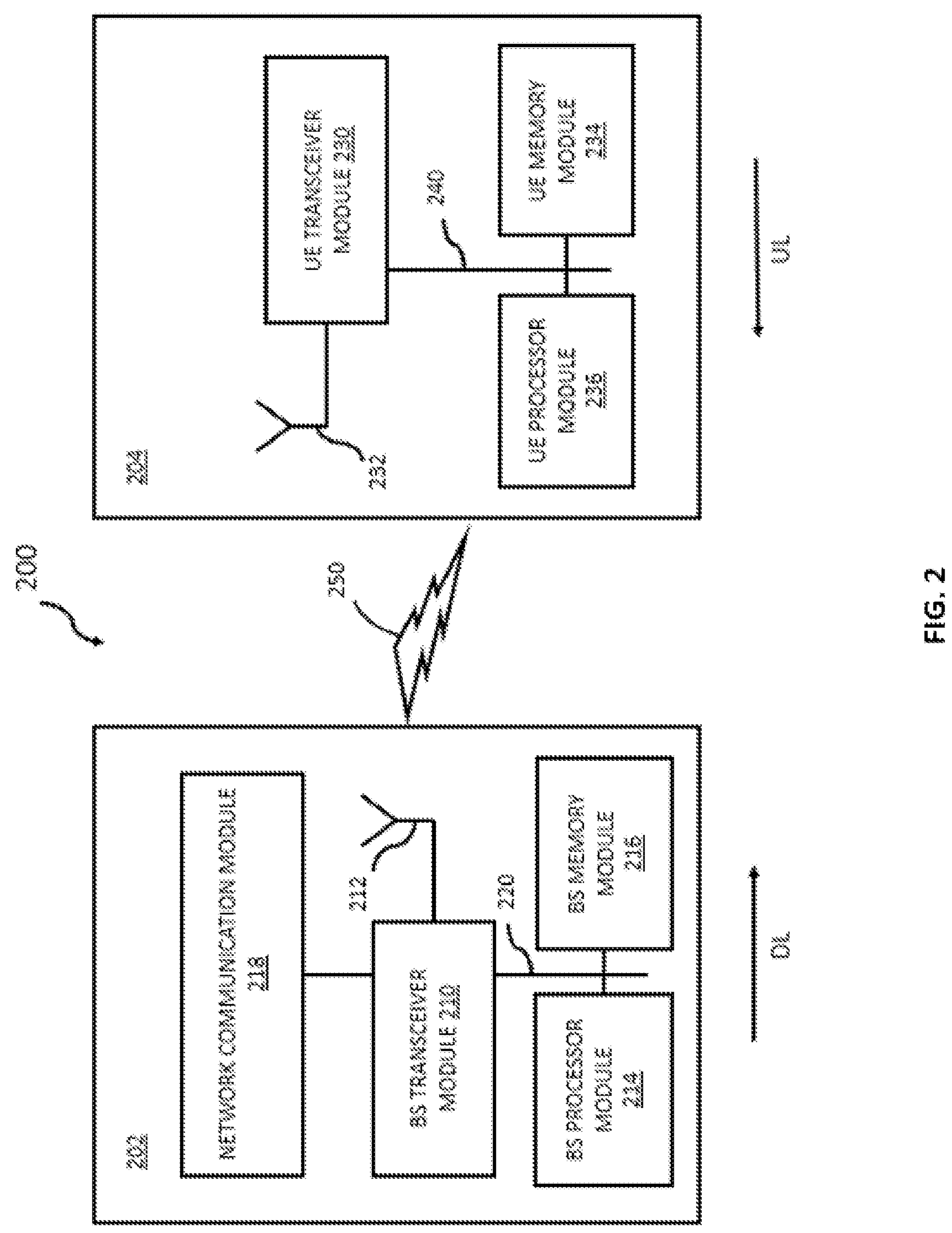
FIG. 2 illustrates a block diagram of an example wireless communication system for transmitting and receiving wireless communication signals in accordance with some arrangements.

FIG. 2 illustrates a block diagram of an example wireless communication system 200 for transmitting and receiving wireless communication signals (e.g., OFDM/OFDMA signals) in accordance with some arrangements of the present disclosure. The system 200 may include components and elements configured to support known or conventional operating features that need not be described in detail herein. In one illustrative arrangement, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the arrangements disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some arrangements, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some arrangements, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some arrangements, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative arrangements, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various arrangements, the BS 202 may be an evolved node B (eNB), gNB, a serving eNB, a target eNB, a femto station, or a pico station, for example. In some arrangements, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the arrangements disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some arrangements, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms “configured for,” “configured to” and conjugations thereof, as used herein with respect to a specified operation or function, refer to a device, component, circuit, structure, machine, signal, etc., that is physically constructed, programmed, formatted and/or arranged to perform the specified operation or function.

Figure 3:
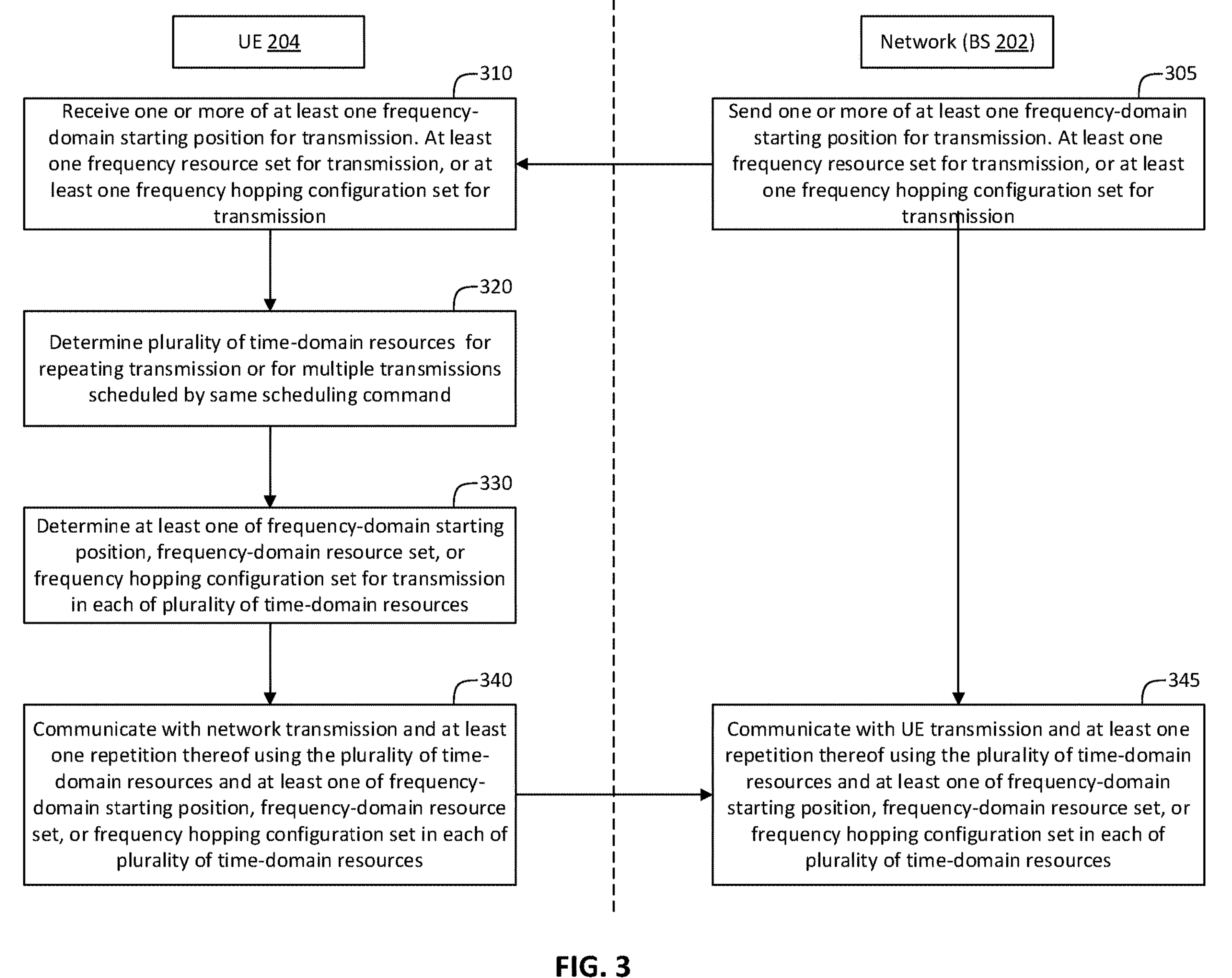
FIG. 3 is flowchart diagram illustrating an example method for managing transmissions across multiple time-domain resources in accordance with some arrangements.

In some arrangements, FIG. 3 is flowchart diagram illustrating an example method 300 for managing transmissions across multiple time-domain resources in accordance with some arrangements. The method 300 can be performed by the UE 204 and the network (e.g., the BS 202).

At 305, the network (e.g., the BS 202) sends one or more of at least one frequency-domain starting position for a transmission, at least one frequency resource set for the transmission, or at least one frequency hopping configuration set for the transmission. At 310, the UE 204 receives the one or more of at least one frequency-domain starting position for a transmission, at least one frequency resource set for the transmission, or at least one frequency hopping configuration set for the transmission. The transmission can be an uplink transmission or a downlink transmission.

At 320, the UE 204 determines a plurality of time-domain resources (e.g., slots, sub-slots, frames, subframes, or another resource in the time domain) for repeating the transmission or for multiple transmissions scheduled by the a same scheduling command.

At 330, the UE 204 determines at least one of a frequency-domain starting position, a frequency-domain resource set, or a frequency hopping configuration set for the transmission in each of the plurality of time-domain resources.

At 340, the UE 204 communicates with the network the transmission and at least one repetition thereof using the plurality of time-domain resources and the at least one of frequency-domain starting position, the frequency-domain resource set, or the frequency hopping configuration set in each of the plurality of time-domain resources. At 345, the network (e.g., the BS 202) communicates with the UE 204 the transmission and at least one repetition thereof using the plurality of time-domain resources and the at least one of frequency-domain starting position, the frequency-domain resource set, or the frequency hopping configuration set in each of the plurality of time-domain resources. The communicating at 340 and 345 includes the UE 204 sending uplink transmissions to the network and the UE 204 receiving downlink transmission from the network.

In some arrangements, the at least one frequency-domain starting position includes a plurality of frequency-domain starting positions (e.g., $\{S_0, S_1 \ldots S_{N-1}\}$). The frequency-domain starting position for each of the plurality of time-domain resources is determined using an index of one (e.g., $S_i$) of the plurality of frequency-domain starting positions and a number (e.g., N) of the plurality of frequency-domain starting positions. The index i is the slot index for time-domain resource.

In some arrangements, an uplink transmission (e.g., PUCCH) is configured by the network (e.g., a base station) with a number (e.g., N) starting positions in the frequency domain (e.g., frequency-domain starting positions), referred to herein as $\{S_0, S_1 \ldots S_{N-1}\}$. The network (e.g., a base station) configures for or indicates to the UE a number (e.g., M) time-domain resources (e.g., slots, sub-slots, frames, sub-frames) for repetitions of this PUCCH transmission. The UE determines the starting frequency-domain position $P_i$ of the PUCCH transmission in each time-domain resource i (e.g., a slot, a sub-slot, a frame, or a subframe) by:

$$P_i = S_{i \bmod N}. \tag{1}$$

In some arrangements, the frequency-domain starting position for each of the plurality of time-domain resources is determined using the index of the one (e.g., $S_i$) of the plurality of frequency-domain starting positions, the number (e.g., N) of the plurality of frequency-domain starting positions, and an index offset. For example, the network (e.g., a base station) indicates an index offset j=0, 1, . . . , N−1 to the UE. The UE determines the starting frequency-domain position $P_i$ of the PUCCH transmission in each time-domain resource (e.g., a slot, a sub-slot, a frame, or a subframe) by:

$$P_i = S_{(i+j) \bmod N}. \tag{2}$$

In the example in which the network does not indicate any index offset j to the UE or if the value of the index offset j is set to null, the UE determines that the index offset j is equal to 0 by default.

In some examples, the network (e.g., the base station) can indicate the index offset j using a DCI. For example, the DCI that is used to schedule the PDSCH and to indicate a PUCCH for HARQ-ACK transmission can be used to indicate the index offset j to the UE. Such DCI includes a field used to indicate the index offset j.

In some examples, the network (e.g., the base station) can indicate the index offset j using a Media Access Control (MAC) Control Element (CE). For example, a MAC-CE can be used to indicate the index offset j for one or more PUCCHs resources.

In some arrangements, the at least one frequency-domain starting position includes one frequency-domain starting position (e.g., $S_0$). The UE 204 receives from the network, at least one frequency-domain offset (e.g., $\{O_0, O_1, \ldots, O_{N-1}\}$). The frequency-domain starting position for each of the plurality of time-domain resources is determined using the one frequency-domain starting position, one (e.g., $O_i$) of the at least one frequency domain offset, and a bandwidth BW for the transmission. In some arrangements, an uplink transmission (e.g., PUCCH) is configured by the network (e.g., a base station) with one starting position in the frequency domain (e.g., one frequency-domain starting position), referred to herein as $S_0$. The network (e.g., the base station) configures for the UE a number (e.g., N) of frequency-domain offsets, referred to herein as $\{O_0, O_1, \ldots, O_{N-1}\}$. The network (e.g., the base station) configures for or indicates to the UE a number (e.g., M) time-domain resources (e.g., slots, sub-slots, frames, subframes) for repetitions of this PUCCH transmission. The UE determines the starting frequency-domain position $P_i$ of the PUCCH transmission in each time-domain resource i (e.g., a slot, a sub-slot, a frame, or a subframe) by:

$$P_i = (S_0 + O_i) \bmod BW. \tag{3}$$

In addition, BW is the bandwidth for uplink transmission. In some examples, the network (e.g., a base station) configures the bandwidth for an uplink transmission via BWP. In some arrangements, the network (e.g., a base station) indicates an index offset j=0, 1, . . . , N−1 to the UE. The UE determines the starting frequency-domain position $P_i$ of the PUCCH transmission in each time-domain resource (e.g., a slot, a sub-slot, a frame, or a subframe) by:

$$P_i = (S_0 + O_{(i+j)\ mod\ N}) \bmod BW. \tag{4}$$

In the example in which the network does not indicate any index offset j to the UE or if the value of the index offset j is set to null, the UE determines that the index offset j is equal to 0 by default.

In some examples, the frequency-domain starting position for each of the plurality of time-domain resources is determined using the one frequency-domain starting position, the one of the at least one frequency domain offset, the bandwidth, a number (e.g., N) of the at least one frequency-domain offset, and an index offset j. In some examples, the network (e.g., the base station) can indicate the index offset j using a DCI. For example, the DCI that is used to schedule the PDSCH and to indicate a PUCCH for HARQ-ACK transmission can be used to indicate the index offset j to the UE. Such DCI includes a field used to indicate the index offset j.

In some examples, the network (e.g., the base station) can indicate the index offset j using a MAC CE. For example, a MAC-CE can be used to indicate the index offset j for one or more PUCCHs resources.

In some arrangements, the at least one frequency-domain starting position includes a plurality of frequency-domain starting positions (e.g., $\{S_0, S_1 \ldots S_{N-1}\}$). Each of the plurality of frequency-domain starting positions is mapped to a frequency portion. As used herein, a frequency portion is defined as a set of RBs allowed for transmission within a BWP in the frequency domain. The RBs of a frequency portion can be continuous or non-continuous.

Figure 4:
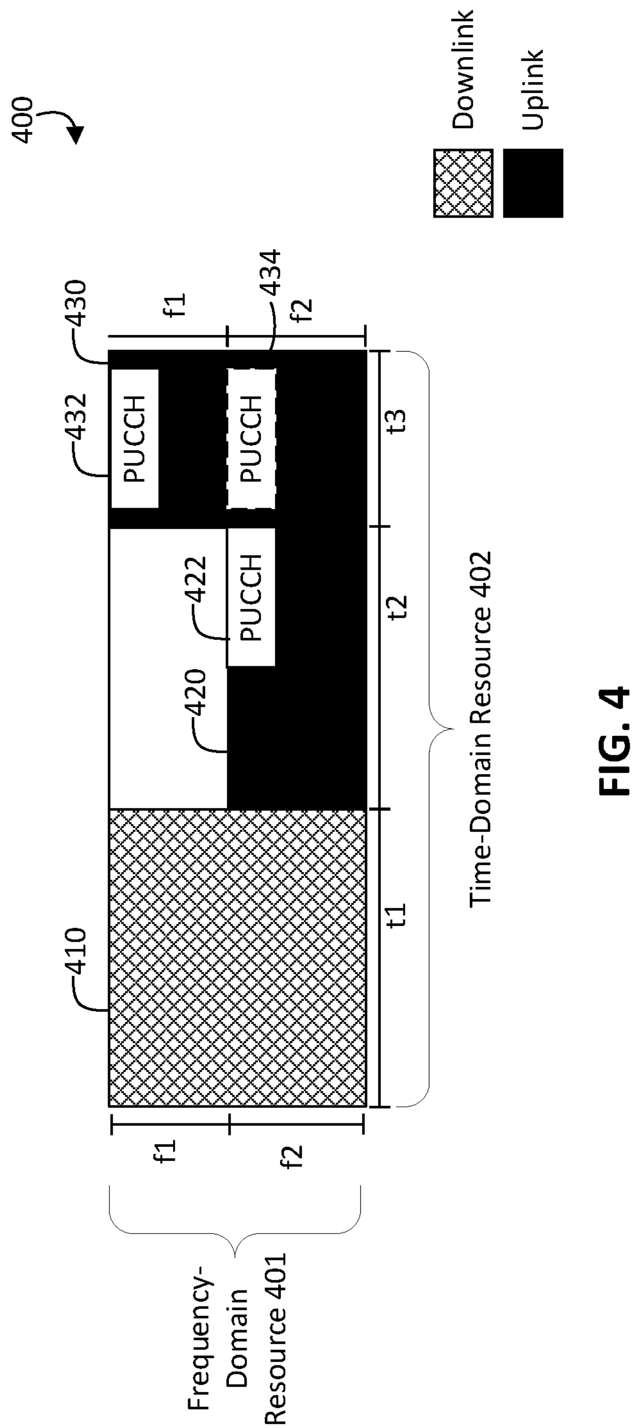
FIG. 4 is a diagram illustrating example time-frequency-domain resource used in transmitting PUCCH, according to various arrangements.

The frequency-domain starting position for each of the plurality of time-domain resources is determined using a mapping between frequency portions ($F_i$) corresponding to the plurality of time-domain resources and the plurality of frequency-domain starting positions. In some arrangements, an uplink frequency portion is defined as a set of Resource Blocks (RBs) allowed for uplink transmission within an uplink Bandwidth Part (BWP) in the frequency domain. The RBs of an uplink frequency portion can be continuous or non-continuous. The uplink frequency portions in different time-domain resources may be different. FIG. 4 is a diagram illustrating example time-frequency-domain resource 400 according to various arrangements.

As shown in FIG. 4, the time-frequency-domain resource 400 includes a frequency-domain resource 401 (y-axis) and a time-domain resource 402 (x-axis). The frequency-domain resource 401 includes first frequency portion f1 and second frequency portion f2. The time-domain resource 402 includes first time-domain portion t1, second time-domain portion t2, and third time-domain portion t3. The time-frequency-domain resource 400 includes a first time-frequency-domain resource 410 (including portions t1, f1, and f2), a second time-frequency-domain resource 420 (including portions t2 and f2), and a third time-frequency-domain resource 430 (including portions t2, f1, and f2). The first time-frequency-domain resource 410 is for downlink transmissions. The second and third time-frequency-domain resources 420 and 430 are for uplink transmissions. As shown, the PUCCH 422 is transmitted by the UE to the network in the time-frequency-domain resource 420. The PUCCHs 432 and 434 are repetitions of PUCCH 422, and the PUCCH 432 or 434 is transmitted by the UE to the network in time-frequency-domain resource 430. The network (e.g., a base station) can configure the mapping between uplink frequency-domain portion and time-domain resource or unit (e.g., slots, sub-slots, frames, subframes) to the UE, e.g., via an uplink frequency pattern. Based on such mapping, the UE can determine the uplink frequency-domain portion (e.g., f1 and/or f2) for each time-domain resource or unit (e.g., slot or sub-slot). For example, based on the mapping, the UE can determine the frequency-domain portions f1 and f2 for the time-domain portion t3, and the frequency-domain portion f2 for time-domain portion t2.

In some arrangements, an uplink transmission (e.g., PUCCH) is configured by the network (e.g., a base station) with a number (e.g., N) starting positions in the frequency domain (e.g., frequency-domain starting positions), referred to herein as $\{S_0, S_1 \ldots S_{N-1}\}$. Each frequency-domain starting position is mapped to an uplink frequency portion. For example, $S_0$ is mapped to a first uplink frequency portion, $S_1$ is mapped to a second uplink frequency portion, and so on. The network (e.g., a base station) configures for or indicates to the UE a number (e.g., M) time-domain resources (e.g., slots, sub-slots, frames, subframes) for repetitions of this PUCCH transmission. The UE determines the frequency-domain starting position $P_i$ of the PUCCH transmission in each time-domain resource i (e.g., a slot, a sub-slot, a frame, or a subframe i) by:

$$P_i = S_{F_i}, \tag{5}$$

where $F_i$ is the uplink frequency-domain portion for or corresponding to time-domain resource i (e.g., slot or sub-slot with i), and $S_{F_i}$ is the frequency-domain starting position mapped to the uplink frequency-domain portion $F_i$.

In some arrangements, the at least one frequency-domain starting position comprises one frequency-domain starting position (e.g., $S_0$). The UE 204 receives from the network, at least one frequency-domain offset (e.g., $\{O_0, O_1, \ldots, O_{N-1}\}$. The frequency-domain starting position for each of the plurality of time-domain resources is determined using the one frequency-domain starting position, one of the at least one frequency domain offset, a bandwidth for the transmission, and a mapping between frequency portions ($F_i$) corresponding to the plurality of time-domain resources and the at least one frequency-domain offset. In some arrangements, an uplink transmission (e.g., PUCCH) is configured by the network (e.g., a base station) with one starting position in the frequency domain (e.g., one frequency-domain starting position), referred to herein as $S_0$. The network (e.g., the base station) configures for the UE a number (e.g., N) of frequency-domain offsets, referred to herein as $\{O_0, O_1, \ldots, O_{N-1}\}$. Each frequency-domain offset is mapped to at least one uplink frequency portion. In some arrangements, one frequency-domain offset is mapped or corresponds to multiple frequency portions (e.g., uplink frequency portions). In other arrangements, one frequency-domain offset is mapped or corresponds to only one frequency portion (e.g., uplink frequency portion). For example, $O_0$ is mapped to a first uplink frequency portion, $O_1$ is mapped to a second uplink frequency portion, and so on. The network (e.g., the base station) configures for or indicates to the UE a number (e.g., M) time-domain resources (e.g., slots, sub-slots, frames, subframes) for repetitions of this PUCCH transmission. The UE determines the starting frequency-domain position $P_i$ of the PUCCH transmission in each time-domain resource i (e.g., a slot, a sub-slot, a frame, or a subframe) by:

$$P_i = (S_0 + O_{F_i}) \bmod BW, \tag{6}$$

where $F_i$ is the uplink frequency-domain portion for or corresponding to time-domain resource i (e.g., slot or sub-slot with i), and $O_{F_i}$ is the frequency-domain offset mapped to the uplink frequency-domain portion $F_i$. In addition, BW is the bandwidth for uplink transmission (e.g., in a number of RBs). In some examples, the network (e.g., a base station) configures the bandwidth for an uplink transmission via BWP.

In some arrangements, i is the slot index for PUCCH transmission, e.g., i=0, 1, . . . , M−1, where the time-domain resource (e.g., the slot) indicated to the UE for the first PUCCH transmission has the slot index i of 0. N and M are integer numbers that are larger than 1. $P_i$ is the starting position in frequency domain for this PUCCH in slot i. M can be equal to, smaller than, or larger than N. BW is the bandwidth for uplink transmission. In some examples, the network (e.g., a base station) configures the bandwidth for an uplink transmission via BWP.

As shown in FIG. 4, the uplink frequency portion in time-domain portion t2 contains frequency portion f2, and the uplink frequency portion in time-domain portion t2 contains frequency portions f1 and f2. The UE is configured to transmit one PUCCH in two slots. For example, PUCCH 422 denotes the first PUCCH transmission. With legacy PUCCH repetition transmission scheme, the repetition of PUCCH 422 is in PUCCH 434, which uses the same frequency resource (e.g., frequency portion f2) as PUCCH 422. However, PUCCH transmission in the middle of an uplink frequency resource splits the entire frequency resource into two smaller parts, thus making it difficult to use for other channels such as PUSCH.

The network can configure two different frequency-domain starting positions for the UE, a first frequency-domain starting position is in t2 and a second frequency-domain starting position is in t3. By configuring an appropriate starting portion, the repetition transmission of PUCCH 422 can be moved to the side of the uplink frequency resource, e.g., PUCCH 432.

In legacy wireless communication systems, PUSCH repetitions are transmitted in the same frequency resource as that used to transmit the initial PUSCH transmission. In some examples, one DCI can be used to schedule multiple PUSCHs with one PUSCH per time-domain resource (e.g., per slot or per sub-slot). All the scheduled PUSCHs are transmitted in the same frequency resource.

In some examples, a network (e.g., a base station) configures for or indicates to a UE to transmit the PUSCH in M time-domain resources (e.g., slots, sub-slots, frames, subframes) for PUSCH repetition transmission. In some examples, a network (e.g., a base station) configures for or indicates to a UE to transmit multiple (e.g., M) PUSCHs using a scheduling command specifying one PUSCH in each time-domain resources (e.g., a slot, a sub-slot, a frame, or a subframe).

In some arrangements, the at least one frequency resource set includes a plurality of frequency resource sets $\{R_0, R_1 \ldots R_{N-1}\}$. The frequency-domain resource set for each of the plurality of time-domain resources is determined using an index of one ($R_i$) of the plurality of frequency resource sets and a number (e.g., N) of the plurality of frequency resource sets. In some arrangements, the network configures or indicates N sets of frequency resources (e.g., $\{R_0, R_1 \ldots R_{N-1}\}$) for or to the UE. Each set of frequency resources includes multiple frequency resources, BWPs, frequency ranges, RBs, or so on. In some arrangements, each set of frequency resoruces includes multiple RB indexes, each identifies an RB. The UE determines the frequency resource $T_i$ for the PUSCH transmission in each time-domain resource i (e.g., each slot or sub-slot) by:

$$T_i = R_{i \bmod N}. \tag{7}$$

In some arrangements, the frequency-domain resource set for each of the plurality of time-domain resources is determined using the index of the one of the plurality of frequency resource sets, the number of the plurality of frequency resource sets, and an index offset. In some arrangements, the network (e.g., a base station) indicates an index offset j=0, 1, . . . , N−1 to the UE. The UE determines the set of frequency resource of the PUSCH transmission in each time-domain resource (e.g., slot or sub-slot) by:

$$T_i = R_{(i+j) \bmod N}. \quad (8)$$

In some examples, the network (e.g., the base station) can indicate the index offset j using a DCI that is used to schedule the PDSCH. Such DCI includes a field used to indicate the index offset j. In the example in which the network does not indicate any index offset j to the UE or if the value of the index offset j is set to null, the UE determines that the index offset j is equal to 0 by default.

In some arrangements, the at least one frequency resource set comprises one frequency resource set (e.g., $R_0$). The UE 204 receives from the network, at least one frequency-domain resource offset (e.g., $\{O_0, O_1, \ldots, O_{N-1}\}$). The frequency-domain resource set for each of the plurality of time-domain resources is determined using the one frequency resource set, one of the at least one frequency-domain resource offset, a number of the at least one frequency-domain resource offset, and a bandwidth for the transmission. In some arrangements, the network configures or indicates one set of frequency resources (e.g., $R_0$) for or to the UE. The network (e.g., the base station) configures for the UE a number (e.g., N) of frequency-domain resource offsets, referred to herein as $\{O_0, O_1, \ldots, O_{N-1}\}$. The UE determines the frequency resource $T_i$ for the PUSCH transmission in each time-domain resource i (e.g., each slot or sub-slot) by:

$$T_i = (R_0 + O_{i \bmod N}) \bmod BW. \quad (9)$$

In some arrangements, $R_0+O_{i \bmod N}$ refers to an offset $O_{i \bmod N}$ is added to all RB indexes in $R_0$. For example, if 2 RBs (RB #0 and RB #1) in the set of frequency resources are indicated for the PUSCH transmission and the offset $O_{i \bmod N}$ is 10, then after adding the offset, RB #10 and RB #11 are used for this PUSCH transmission, assuming BW is 100 RBs. The UE transmits the PUSCH in the set frequency resource $RB_i$. Each set of frequency resource contains continuous or non-continuous RBs in some examples.

In some arrangements, the frequency-domain resource set for each of the plurality of time-domain resources is determined using the one frequency resource set, the one of the at least one frequency-domain resource offset, the number of the at least one frequency-domain resource offset, the bandwidth for the transmission, and an index offset. In some arrangements, the network (e.g., a base station) indicates an index offset j=0, 1, . . . , N−1 to the UE. The UE determines the set of frequency resources $T_i$ for the PUSCH transmission in each time-domain resource (e.g., slot or sub-slot) by:

$$T_i = (R_0 + O_{(i+j) \bmod N}) \bmod BW. \quad (10)$$

In some examples, the network (e.g., the base station) can indicate the index offset j using a DCI that is used to schedule the PDSCH. Such DCI includes a field used to indicate the index offset j. In the example in which the network does not indicate any index offset j to the UE or if the value of the index offset j is set to null, the UE determines that the index offset j is equal to 0 by default.

In some arrangements, the network (e.g., the base station) configures the N offsets using suitable signaling (e.g., Radio Resource Control (RRC) signaling). In some arrangements, the network (e.g., the base station) indicates the N offsets using DCI that schedules the PUSCH or MAC-CE. In some examples, the network configures using RRC multiple offsets, where each of the N offsets is identified using a row index. The DCI or MAC-CE indicates the row index to the UE. The UE determines the N offsets via the row index.

Figure 5:
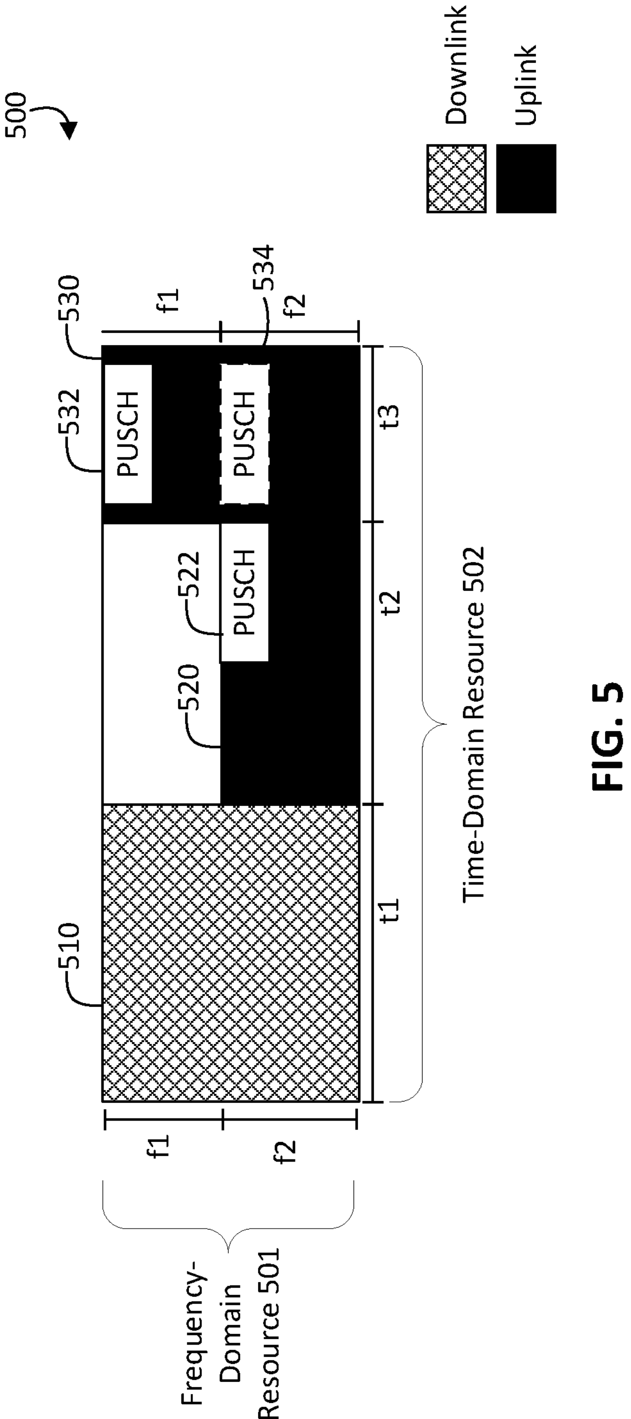
FIG. 5 is a diagram illustrating example time-frequency-domain resource used in transmitting PUSCH, according to various arrangements.

In some arrangements, the at least one frequency resource set includes a plurality of frequency resource sets (e.g., $\{R_0, R_1 \ldots R_{N-1}\}$). The frequency-domain resource set for each of the plurality of time-domain resources is determined using a mapping between frequency portions (e.g., $F_i$) corresponding to the plurality of time-domain resources and the plurality of frequency resource sets. In some arrangements, an uplink frequency portion is defined as a set of RBs allowed for uplink transmission within an uplink BWP in the frequency domain. The RBs of an uplink frequency portion can be continuous or non-continuous. The uplink frequency portions in different time-domain resources may be different. FIG. 5 is a diagram illustrating example time-frequency-domain resource 500 according to various arrangements.

As shown in FIG. 5, the time-frequency-domain resource 500 includes a frequency-domain resource 501 (y-axis) and a time-domain resource 502 (x-axis). The frequency-domain resource 501 includes first frequency portion f1 and second frequency portion f2. The time-domain resource 502 includes first time-domain portion t1, second time-domain portion t2, and third time-domain portion t3. The time-frequency-domain resource 500 includes a first time-frequency-domain resource 510 (including portions t1, f1, and f2), a second time-frequency-domain resource 520 (including portions t2 and f2), and a third time-frequency-domain resource 530 (including portions t2, f1, and f2). The first time-frequency-domain resource 510 is for downlink transmissions. The time-frequency-domain resources 520 and 530 are for uplink transmissions. As shown, the PUSCH 522 is transmitted by the UE to the network in the time-frequency-domain resource 520. The PUSCHs 532 and 534 are repetitions of PUSCH 522, and the PUSCH 532 or 534 is transmitted by the UE to the network in time-frequency-domain resource 530. The network (e.g., a base station) can configure the mapping between uplink frequency-domain portion and time-domain resource or unit (e.g., slots, sub-slots, frames, subframes) to the UE, e.g., via an uplink frequency pattern. Based on such mapping, the UE can determine the uplink frequency-domain portion (e.g., f1 and/or f2) for each time-domain resource or unit (e.g., slot or sub-slot). For example, based on the mapping, the UE can determine the frequency-domain portions f1 and f2 for the time-domain portion t3, and the frequency-domain portion f2 for time-domain portion t2.

In some arrangements, the network configures or indicates N sets of frequency resources (e.g., $\{R_0, R_1 \ldots R_{N-1}\}$) for or to the UE. Each set of frequency resources includes multiple frequency resources, BWPs, frequency ranges, RBs, or so on. In some arrangements, each set of frequency resources includes multiple RB indexes, each identifies an RB. Each set of frequency resources is mapped with an uplink frequency portion. In some arrangements, one set of frequency resources is mapped or corresponds to multiple frequency portions (e.g., uplink frequency portions). In other arrangements, one set of frequency resources is mapped or corresponds to only one frequency portion (e.g., uplink frequency portion). For example, $R_0$ is mapped with a first uplink frequency portion, $R_1$ is mapped with a second uplink frequency portion, and so on. The UE determines the set of frequency resources $T_i$ for the PUSCH transmission in each time-domain resource i (e.g., each slot or sub-slot) by:

$$T_i = R_{F_i}, \tag{11}$$

where $F_i$ is the uplink frequency-domain portion for or corresponding to time-domain resource i (e.g., slot or sub-slot with i), and $R_{F_i}$ is the set of frequency resources mapped to the uplink frequency-domain portion $F_i$. The UE transmits the PUSCH in time-domain resource i in the set of frequency resource $T_i$.

In some arrangements, the at least one frequency resource set includes one frequency resource set (e.g., $R_0$). The UE 204 receives from the network, at least one frequency-domain resource offset (e.g., $\{O_0, O_1, \ldots, O_{N-1}\}$). The frequency-domain resource set for each of the plurality of time-domain resources is determined using the one frequency resource set, one of the at least one frequency domain resource offset, a bandwidth for the transmission, and a mapping between frequency-domain portions ($F_i$) corresponding to the plurality of time-domain resources and the at least one frequency-domain resource offset. In some arrangements, the network configures or indicates one set of frequency resources (e.g., $R_0$) for or to the UE. The network (e.g., the base station) configures for the UE a number (e.g., N) of frequency-domain resource offsets, referred to herein as $\{O_0, O_1, \ldots, O_{N-1}\}$. Each frequency-domain resource offset is mapped with an uplink frequency portion. In some arrangements, one frequency-domain resource offset is mapped or corresponds to multiple frequency portions (e.g., uplink frequency portions). In other arrangements, one frequency-domain resource offset is mapped or corresponds to only one frequency portion (e.g., uplink frequency portion). For example, $O_0$ is mapped with a first uplink frequency portion, $O_1$ is mapped with a second uplink frequency portion, and so on. The UE determines the frequency resource set $T_i$ for the PUSCH transmission in each time-domain resource i (e.g., each slot or sub-slot) by:

$$T_i = \left(R_0 + O_{F_i}\right) \bmod BW. \tag{12}$$

$F_i$ is the uplink frequency portion for the time-domain resource i (e.g., slot i or sub-slot i). $O_{F_i}$ is the frequency-domain resource offset mapped with UL frequency portion $F_i$. In some arrangements, $R_0+O_{F_i}$ refers to a frequency-domain resource offset $O_{F_i}$ is added to all RB indexes in $R_0$. For example, if 2 RBs (RB #0 and RB #1) in the set of frequency resources are indicated for the PUSCH transmission and the $O_{F_i}$ is 10, then after adding the offset, RB #10 and RB #11 are used for this PUSCH transmission, assuming BW is 100 RBs. The UE transmits the PUSCH in time-domain resource i in the set of frequency resource $T_i$.

In some arrangements, i is the slot index for PUSCH transmission, e.g., i=0, 1, . . . , M−1, where the time-domain resource (e.g., the slot) indicated to the UE for the first PUSCH transmission has the slot index i of 0. N and M are integer numbers that are larger than 1. M can be equal to, smaller than, or larger than N. $T_i$ is the set of frequency resources for this PUSCH transmission in time-domain resource i. The UE transmits the PUSCH in the set of frequency resources $T_i$. Each set of frequency resource contains a number of continuous or non-continuous RBs. BW is the bandwidth for uplink transmission. In some examples, the network (e.g., a base station) configures the bandwidth for an uplink transmission via BWP.

In some arrangements, the network configures the PUSCH repetition via RRC signaling. The RRC signaling configures a repetition number M. The UE transmits the PUSCH transmission M times with one PUSCH transmission in one time-domain resource (e.g., one slot or sub-slot). The network can indicate the PUSCH repetition via the scheduling DCI. For example, the DCI scheduling the PUSCH indicates a repetition number M. The UE transmits the PUSCH transmission M times with one PUSCH transmission in one time-domain resource (e.g., one slot or sub-slot).

In some arrangements, the network can indicate to the UE to transmit M PUSCHs using one DCI. For example, the DCI can include M Start and Length Indicator Values (SLIVs).

The at least one set of frequency resources (e.g., the one set in some example and N sets in other examples) for the PUSCH transmission can be configured by RRC signaling. In some arrangements, the at least one set of frequency resource for PUSCH transmission can be indicated using the DCI scheduling this PUSCH transmission. Each set of frequency resources for the PUSCH transmission can be configured using a bitmap indicating the Resource Block Groups (RBGs) that are allocated to the PUSCH, or by a Resource Indication Value (RIV) corresponding to a starting virtual resource block and a length in terms of contiguously allocated resource blocks, or by indicating a set of interlace indices to the UE.

In some arrangements, as shown in FIG. 5, the uplink frequency portion in time-domain portion t2 contains frequency portion f2, and the uplink frequency portion in time-domain portion t2 contains frequency portions f1 and f2. The UE is configured to transmit one PUSCH in two slots. For example, PUSCH 522 denotes the first PUSCH transmission. With legacy PUSCH repetition transmission scheme, the repetition of PUSCH 522 is in PUSCH 534, which uses the same frequency resource (e.g., frequency portion f2) as PUSCH 522. Conventionally for one DCI scheduling multiple PUSCHs, if both the PUSCH 522 in t2 and PUSCH in t3 are scheduled by same scheduling command (e.g., the same DCI), the PUSCH in t3 (e.g., PUSCH 534) uses the same frequency resource f2 as PUSCH 522. In some arrangements, two sets of frequency resources can be indicated by the base station to the UE. One is for the PUSCH 522 in time-domain portion t2 and another set is for the PUSCH 532 in time-domain portion t3.

In legacy wireless communication systems, PDSCH repetitions are received by the UE in the same frequency resource as that used to receive the initial PDSCH transmission. In some examples, one DCI can be used to schedule multiple PDSCHs with one PDSCH per time-domain resource (e.g., per slot or per sub-slot). All the scheduled PDSCHs are received in the same frequency resource.

In some examples, a network (e.g., a base station) configures for or indicates to a UE to receive the PDSCH in M time-domain resources (e.g., slots, sub-slots, frames, subframes) for PDSCH repetition transmission. In some examples, a network (e.g., a base station) configures for or indicates to a UE to receive multiple (e.g., M) PDSCHs using a scheduling command specifying one PDSCH in each time-domain resources (e.g., a slot, a sub-slot, a frame, or a subframe).

In some arrangements, the at least one frequency resource set includes a plurality of frequency resource sets $\{R_0, R_1 \ldots R_{N-1}\}$. The frequency-domain resource set for each of the plurality of time-domain resources is determined using an index of one ($R_i$) of the plurality of frequency resource sets and a number (e.g., N) of the plurality of frequency resource sets. In some arrangements, the network configures or indicates N sets of frequency resources (e.g., $\{R_0, R_1 \ldots R_{N-1}\}$) for or to the UE. Each set of frequency resources includes multiple frequency resources, BWPs, frequency ranges, RBs, or so on. In some arrangements, each set of frequency resoruces includes multiple RB indexes, each identifies an RB. The UE determines the frequency resource $T_i$ for the PDSCH transmission in each time-domain resource i (e.g., each slot or sub-slot) by:

$$T_i = R_{i \bmod N}. \quad (13)$$

In some arrangements, the frequency-domain resource set for each of the plurality of time-domain resources is determined using the index of the one of the plurality of frequency resource sets, the number of the plurality of frequency resource sets, and an index offset. In some arrangements, the network (e.g., a base station) indicates an index offset j=0, 1, . . . , N−1 to the UE. The UE determines the set of frequency resource of the PDSCH transmission in each time-domain resource (e.g., slot or sub-slot) by:

$$T_i = R_{(i+j) \bmod N}. \quad (14)$$

In some examples, the network (e.g., the base station) can indicate the index offset j using a DCI that is used to schedule the PDSCH. Such DCI includes a field used to indicate the index offset j. In the example in which the network does not indicate any index offset j to the UE or if the value of the index offset j is set to null, the UE determines that the index offset j is equal to 0 by default.

In some arrangements, the at least one frequency resource set comprises one frequency resource set (e.g., $R_0$). The UE 204 receives from the network, at least one frequency-domain resource offset (e.g., $\{O_0, O_1, \ldots, O_{N-1}\}$). The frequency-domain resource set for each of the plurality of time-domain resources is determined using the one frequency resource set, one of the at least one frequency-domain resource offset, a number of the at least one frequency-domain resource offset, and a bandwidth for the transmission. In some arrangements, the network configures or indicates one set of frequency resources (e.g., $R_0$) for or to the UE. The network (e.g., the base station) configures for the UE a number (e.g., N) of frequency-domain resource offsets, referred to herein as $\{O_0, O_1, \ldots, O_{N-1}\}$. The UE determines the frequency resource $T_i$ for the PDSCH transmission in each time-domain resource i (e.g., each slot or sub-slot) by:

$$T_i = (R_0 + O_{i \bmod N}) \bmod BW. \quad (15)$$

In some arrangements, $R_0+O_{i \bmod N}$ refers to an offset $O_{i \bmod N}$ is added to all RB indexes in $R_0$. For example, if 2 RBs (RB #0 and RB #1) in the set of frequency resources are indicated for the PDSCH transmission and the offset $O_{i \bmod N}$ is 10, then after adding the offset, RB #10 and RB #11 are used for this PDSCH transmission, assuming BW is 100 RBs. The UE receives the PDSCH in the set frequency resource $RB_i$. Each set of frequency resource contains continuous or non-continuous RBs in some examples.

In some arrangements, the frequency-domain resource set for each of the plurality of time-domain resources is determined using the one frequency resource set, the one of the at least one frequency-domain resource offset, the number of the at least one frequency-domain resource offset, the bandwidth for the transmission, and an index offset. In some arrangements, the network (e.g., a base station) indicates an index offset j=0, 1, . . . , N−1 to the UE. The UE determines the set of frequency resources $T_i$ for the PDSCH transmission in each time-domain resource (e.g., slot or sub-slot) by:

$$T_i = (R_0 + O_{(i+j) \bmod N}) \bmod BW. \quad (16)$$

In some examples, the network (e.g., the base station) can indicate the index offset j using a DCI that is used to schedule the PDSCH. Such DCI includes a field used to indicate the index offset j. In the example in which the network does not indicate any index offset j to the UE or if the value of the index offset j is set to null, the UE determines that the index offset j is equal to 0 by default.

In some arrangements, the network (e.g., the base station) configures the N offsets using suitable signaling (e.g., RRC signaling). In some arrangements, the network (e.g., the base station) indicates the N offsets using DCI that schedules the PDSCH or MAC-CE. In some examples, the network configures using RRC multiple offsets, where each of the N offsets is identified using an index. The DCI or MAC-CE indicates the index to the UE. The UE determines the N offsets via the index.

Figure 6:
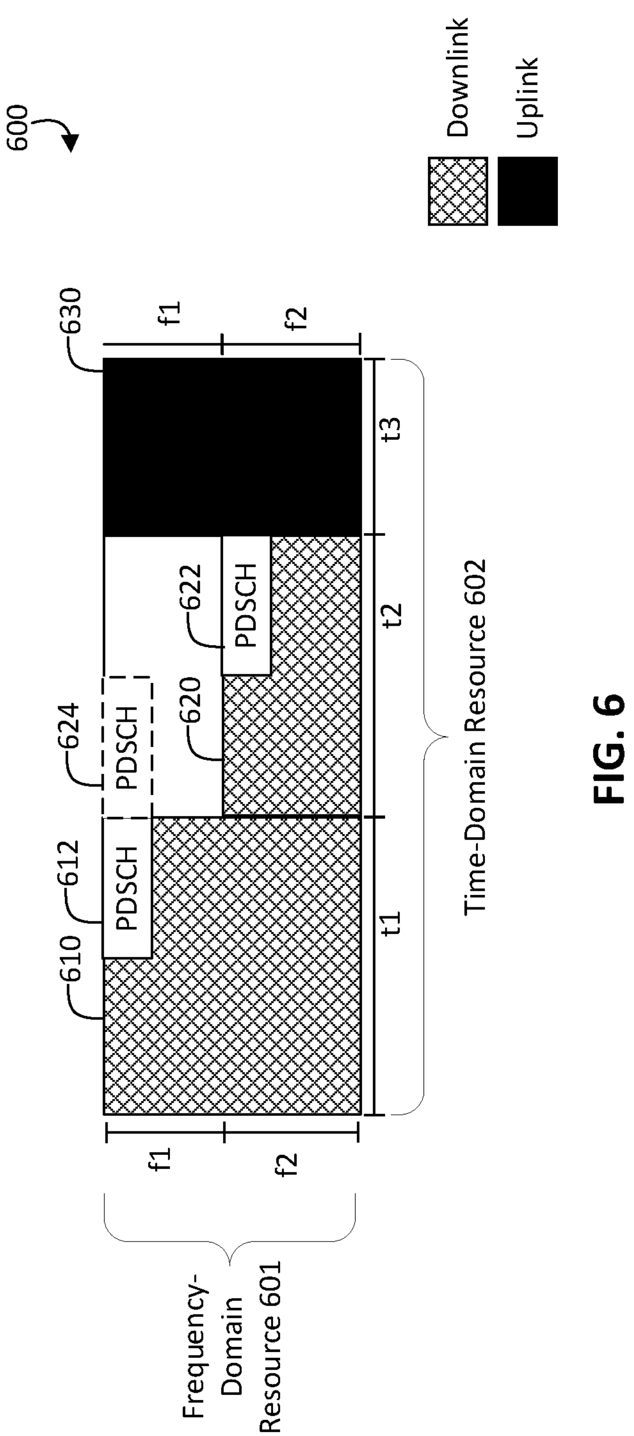
FIG. 6 is a diagram illustrating example time-frequency-domain resource, according to various arrangements.

In some arrangements, the at least one frequency resource set includes a plurality of frequency resource sets (e.g., {R0, R1 . . . RN−1}). The frequency-domain resource set for each of the plurality of time-domain resources is determined using a mapping between frequency portions (e.g., $F_i$) corresponding to the plurality of time-domain resources and the plurality of frequency resource sets. In some arrangements, an downlink frequency portion is defined as a set of RBs allowed for downlink transmission within an downlink BWP in the frequency domain. The RBs of an downlink frequency portion can be continuous or non-continuous. The downlink frequency portions in different time-domain resources may be different. FIG. 6 is a diagram illustrating example time-frequency-domain resource 600 according to various arrangements.

As shown in FIG. 6, the time-frequency-domain resource 600 includes a frequency-domain resource 601 (y-axis) and a time-domain resource 602 (x-axis). The frequency-domain resource 601 includes first frequency portion f1 and second frequency portion f2. The time-domain resource 602 includes first time-domain portion t1, second time-domain portion t2, and third time-domain portion t3. The time-frequency-domain resource 600 includes a first time-frequency-domain resource 610 (including portions t1, f1, and f2), a second time-frequency-domain resource 620 (including portions t2 and f2), and a third time-frequency-domain resource 630 (including portions t2, f1, and f2). The first time-frequency-domain resource 610 and the second time-frequency-domain resource 620 are for downlink transmissions. The time-frequency-domain resource 630 is for downlink transmissions. The downlink frequency portions in different time-domain resources can be different. As shown, the PDSCH 612 is received by the UE from the network in the time-frequency-domain resource 610. The PDSCH 622 is a retransmission of PDSCH 612 and is received by the UE from the network in time-frequency-domain resource 620.

The network (e.g., a base station) can configure the mapping between downlink frequency-domain portion and time-domain resource or unit (e.g., slots, sub-slots, frames, subframes) to the UE, e.g., via an downlink frequency pattern. Based on such mapping, the UE can determine the downlink frequency-domain portion (e.g., f1 and/or f2) for each time-domain resource or unit (e.g., slot or sub-slot). For example, based on the mapping, the UE can determine the frequency-domain portion f2 for time-domain portion t2.

In some arrangements, the network configures or indicates N sets of frequency resources (e.g., $\{R_0, R_1 \ldots R_{N-1}\}$) for or to the UE. Each set of frequency resources includes multiple frequency resources, BWPs, frequency ranges, RBs, or so on. In some arrangements, each set of frequency resources includes multiple RB indexes, each identifies an RB. Each set of frequency resources is mapped with an downlink frequency portion. In some arrangements, one set of frequency resources is mapped or corresponds to multiple frequency portions (e.g., downlink frequency portions). In other arrangements, one set of frequency resources is mapped or corresponds to only one frequency portion (e.g., downlink frequency portion). For example, $R_0$ is mapped with a first downlink frequency portion, $R_1$ is mapped with a second downlink frequency portion, and so on. The UE determines the set of frequency resources $T_i$ for the PDSCH transmission in each time-domain resource i (e.g., each slot or sub-slot) by:

$$T_i = R_{F_i}, \tag{17}$$

where $F_i$ is the downlink frequency-domain portion for or corresponding to time-domain resource i (e.g., slot or sub-slot with i), and $R_{F_i}$ is the set of frequency resources mapped to the downlink frequency-domain portion $F_i$. The UE receives the PDSCH in time-domain resource i in the set of frequency resource $T_i$.

In some arrangements, the at least one frequency resource set includes one frequency resource set (e.g., $R_0$). The UE 204 receives from the network, at least one frequency-domain resource offset (e.g., $\{O_0, O_1, \ldots, O_{N-1}\}$). The frequency-domain resource set for each of the plurality of time-domain resources is determined using the one frequency resource set, one of the at least one frequency domain resource offset, a bandwidth for the transmission, and a mapping between frequency-domain portions ($F_i$) corresponding to the plurality of time-domain resources and the at least one frequency-domain resource offset. In some arrangements, the network configures or indicates one set of frequency resources (e.g., $R_0$) for or to the UE. The network (e.g., the base station) configures for the UE a number (e.g., N) of frequency-domain resource offsets, referred to herein as $\{O_0, O_1, \ldots, O_{N-1}\}$. Each frequency-domain resource offset is mapped with an downlink frequency portion. In some arrangements, one frequency-domain resource offset is mapped or corresponds to multiple frequency portions (e.g., downlink frequency portions). In other arrangements, one frequency-domain resource offset is mapped or corresponds to only one frequency portion (e.g., downlink frequency portion). For example, $O_0$ is mapped with a first downlink frequency portion, $O_1$ is mapped with a second downlink frequency portion, and so on. The UE determines the frequency resource set $T_i$ for the PDSCH transmission in each time-domain resource i (e.g., each slot or sub-slot) by:

$$T_i = (R_0 + O_{F_i}) \bmod BW. \tag{18}$$

$F_i$ is the downlink frequency portion for the time-domain resource i (e.g., slot i or sub-slot i). $O_{F_i}$ is the frequency-domain resource offset mapped with UL frequency portion $F_i$. In some arrangements, $R_0+O_{F_i}$ refers to a frequency-domain resource offset $O_{F_i}$ is added to all RB indexes in $R_0$. For example, if 2 RBs (RB #0 and RB #1) in the set of frequency resources are indicated for the PUSCH transmission and the $O_{F_i}$ is 10, then after adding the offset, RB #10 and RB #11 are used for this PUSCH transmission, assuming BW is 100 RBs. The UE receives the PDSCH in time-domain resource i in the set of frequency resource $T_i$.

In some arrangements, i is the slot index for PDSCH transmission, e.g., i=0, 1, . . . , M−1, where the time-domain resource (e.g., the slot) indicated to the UE for the first PDSCH transmission has the slot index i of 0. N and M are integer numbers that are larger than 1. M can be equal to, smaller than, or larger than N. $T_i$ is the set of frequency resources for this PDSCH transmission in time-domain resource i. The UE receives the PDSCH in the set of frequency resources $T_i$. Each set of frequency resource contains a number of continuous or non-continuous RBs. BW is the bandwidth for the downlink transmission. In some examples, the network (e.g., a base station) configures the bandwidth for an downlink transmission via BWP.

In some arrangements, the network configures the PDSCH repetition via RRC signaling. The RRC signaling configures a repetition number M. The UE receives the PDSCH transmission M times with one PDSCH transmission in one time-domain resource (e.g., one slot or sub-slot). The network can indicate the PDSCH repetition via the scheduling DCI. For example, the DCI scheduling the PDSCH indicates a repetition number M. The UE receives the PDSCH transmission M times with one PDSCH transmission in one time-domain resource (e.g., one slot or sub-slot).

In some arrangements, the network can indicate to the UE to receive M PDSCHs using one DCI. For example, the DCI can include M SLIVs.

The at least one set of frequency resources (e.g., the one set in some example and N sets in other examples) for the PDSCH transmission can be configured by RRC signaling. In some arrangements, the at least one set of frequency resource for PDSCH transmission can be indicated using the DCI scheduling this PDSCH transmission. Each set of frequency resources for the PDSCH transmission can be configured using a bitmap indicating the RBGs that are allocated to the PDSCH, or by a RIV corresponding to a starting virtual resource block and a length in terms of contiguously allocated resource blocks, or by indicating a set of interlace indices to the UE.

In some arrangements, as shown in FIG. 6, the downlink frequency portion in time-domain portion t2 contains frequency portion f2, and the downlink frequency portion in time-domain portion t1 contains frequency portions f1 and f2. The UE is configured to receive one PDSCH in two slots. For example, PDSCH 612 denotes the first PDSCH transmission. With legacy PDSCH repetition transmission scheme, the repetition of PDSCH 612 is in PDSCH 624, which uses the same frequency resource (e.g., frequency portion f1 as PDSCH 612. Conventionally for one DCI scheduling multiple PDSCHs, if both the PDSCH 612 in t2 and PDSCH in t3 are scheduled by the same scheduling command (e.g., DCI), the PDSCH in t3 (e.g., PDSCH 624) uses the same frequency resource f2 as PDSCH 612. In some arrangements, two sets of frequency resources can be indicated by the base station to the UE. One is for the PDSCH 612 in time-domain portion t1 and another set is for the PDSCH 622 in time-domain portion t2.

In some arrangements, the at least one frequency hopping configuration set includes a plurality of frequency hopping configuration sets. The frequency hopping configuration set for the transmission in each of the plurality of time-domain resources is determined using one of the plurality of frequency hopping configuration sets and a number of the plurality of frequency hopping configuration sets. In some arrangements, the network (e.g., a base station) configures N sets of frequency hopping configurations for the UE, referred to herein as $\{C_0, C_1 \ldots C_{N-1}\}$. The UE transmits a PUCCH with frequency hopping in M time-domain resources (e.g., slots, sub-slots, frames, subframes). The UE uses the set of frequency hopping configuration determined using $C_{i \bmod N}$ for transmitting the PUCCH in time-domain resource i (e.g., slot i or sub-slot i). M and N are integer number that is larger than 1.

In some arrangements, the frequency hopping configuration set for the transmission in each of the plurality of time-domain resources is determined using the one of the plurality of frequency hopping configuration sets, the number of the plurality of frequency hopping configuration sets, an index of the one of the plurality of frequency hopping configuration sets, and an index offset. In some arrangements, the network (e.g., a base station) configures N sets of frequency hopping configurations for the UE, referred to herein as $\{C_0, C_1 \ldots C_{N-1}\}$. The UE transmits a PUCCH with frequency hopping in M time-domain resources (e.g., slots, sub-slots, frames, subframes). The network indicates index offset j (e.g., j=0, 1, . . . , N−1) to the UE. For example, the network can indicate the index offset using a DCI that schedules the PDSCH which indicates the PUCCH for HARQ feedback. The UE uses the set of frequency hopping configuration determined using $C_{i+j \bmod N}$ for transmitting the PUCCH in time-domain resource i (e.g., slot i or sub-slot i). M and N are integer number that is larger than 1. In the example in which the network does not indicate any index offset j to the UE or if the value of the index offset j is set to null, the UE determines that the index offset j is equal to 0 by default.

In some arrangements, the at least one frequency hopping configuration set comprises a plurality of frequency hopping configuration sets. The plurality of frequency hopping configuration sets is mapped to uplink frequency portions via a first mapping. The uplink frequency portions are mapped to the plurality of time-domain resources via a second mapping. The frequency hopping configuration set for the transmission in each of the plurality of time-domain resources is determined using the first mapping and the second mapping. In some arrangements, the network (e.g., a base station) configures N sets of frequency hopping configurations for the UE, referred to herein as $\{C_0, C_1 \ldots C_{N-1}\}$. Each set of frequency hopping configuration is mapped to an uplink frequency portion, e.g., referred to as the first mapping. $F_i$ is the uplink frequency portion mapped to time-domain resource i (e.g., slot i or sub-slot i), referred as the second mapping. UE uses the frequency hopping configuration mapped to $F_i$ to transmit the PUCCH in time-domain resource i, where i is the time-domain resource index (e.g., a slot index or sub-slot index) for the PUCCH transmission. N is an integer number that is larger than 1.

In some arrangements, each set of frequency hopping configurations contains at least the starting Physical RB (PRB) of the first hop and the starting PRB of the second hop. If the PUSCH/PUCCH is transmitted in four time-domain resources (e.g., slots or sub-slots), the PUSCH/PUCCH in the first, second, third, and fourth time-domain resources are referred to as the first hop, second hop, first hop and second hop, respectively. The frequency-domain resource for the transmission of the first hop and the second hop can be different.

In some arrangements, each of the at least one frequency hopping configuration set comprises a starting PRB for a first hop and a starting PRB for a second hop, the frequency hopping configuration set for the transmission in each of the plurality of time-domain resources is determined using the starting PRB for the first hop and the starting PRB for the second hop. A first frequency hopping configuration set of the at least one frequency hopping configuration set contains a starting PRB for the first hop and a starting PRB for the second hop. Each of other frequency hopping configuration sets of the at least one frequency hopping configuration set contains at least one of a first offset for the first hop relative to the starting PRB for the first hop and a second offset for the second hop relative to the starting PRB for the second hop. The frequency hopping configuration set for the transmission in each of the plurality of time-domain resources is determined using at least one of the starting PRB for the first hop, the starting PRB for the second hop, the first offset, or the second offset.

For instance, in some arrangements, a first set of frequency hopping configurations contains the starting PRB of the first hop and the starting PRB of the second hop. The other sets of hopping configurations contain a first offset for the first hop relative to the starting PRB of the first hop or a second offset for the second hop relative to the starting PRB of the second hop. The offset can be a positive, negative value or zero. UE determines the frequency resource for PUCCH transmission based on the starting PRB s (e.g., contained in the first set of frequency hopping configurations) for the first or second hop and the offset for the first or second hop (contained in the other sets).

In some arrangements, the first set of frequency hopping configurations contains the starting PRB of the first hop and the starting PRB of the second hop. The other sets of hopping configurations each contains the first offset for the first hop and the second offset for the second hop, respectively. The offset can be a positive, negative value or zero. UE determines the frequency resource for PUCCH transmission based on the starting PRB and the offset.

In some examples in which the starting PRB of the first hop or second hop is denoted as startingPRB #i and the offset for the first hop or the second hop is denoted as offset #i, the starting PRB for the first hop or the second hop of the PUCCH is determined using:

$$startingPRB\#i + offset\#i, \tag{19}$$

where i refers to the first hop or the second hop.

Figure 7:
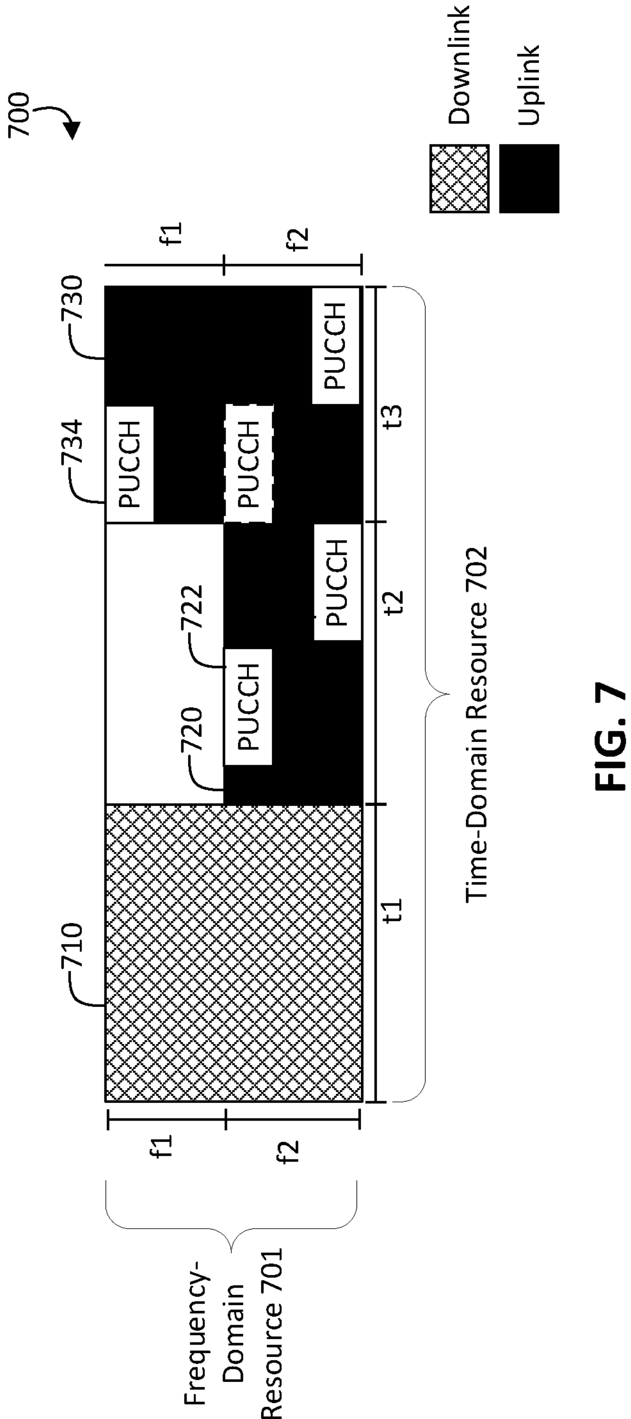
FIG. 7 is a diagram illustrating example time-frequency-domain resource, according to various arrangements.

In some arrangements, FIG. 7 is a diagram illustrating example time-frequency-domain resource 700. As shown in FIG. 7, the time-frequency-domain resource 700 includes a frequency-domain resource 701 (y-axis) and a time-domain resource 702 (x-axis). The frequency-domain resource 701 includes first frequency portion f1 and second frequency portion f2. The time-domain resource 702 includes first time-domain portion t1, second time-domain portion t2, and third time-domain portion t3. The time-frequency-domain resource 700 includes a first time-frequency-domain resource 710 (including portions t1, f1, and f2), a second time-frequency-domain resource 720 (including portions t2 and f2), and a third time-frequency-domain resource 730 (including portions t2, f1, and f2). The first time-frequency-domain resource 710 is for downlink transmissions. The time-frequency-domain resources 720 and 730 are for downlink transmissions.

The downlink frequency portions in different time-domain resources can be different. The uplink frequency portion in t2 contains the frequency resource portion f2, and the uplink frequency portion in t3 contains frequency resource portions f1 and f2. With legacy PUCCH frequency hopping transmission scheme, four PUCCH transmissions are PUCCH 722, PUCCH 724, PUCCH 732 and PUCCH 736, respectively. PUCCH 722 and PUCCH 732 (or PUCCH 734) are the first hop. PUCCH 724 and PUCCH 736 are the second hop. However, PUCCH transmission in the middle of the uplink frequency resource (e.g., PUCCH 732) splits the entire frequency resource into two smaller parts, thus making it difficult to use for other channels, e.g., PUSCH.

In some arrangements, two sets of frequency hopping configurations containing the starting PRBs for the first hop and the second hop are indicated to the UE, which can be denoted as {startingPRB #1, secondHopPRB #1} and {startingPRB #2, secondHopPRB #2}. The startingPRB #1 and secondHopPRB #1 are the starting PRB for the first hop and second hop for the frequency portion in t2, respectively. The startingPRB #2 and secondHopPRB #2 are the starting PRB for the first hop and second hop for the frequency portion in t3, respectively. For example, base station indicates startingPRB #1=49, secondHopPRB #1=0, startingPRB #2=99 and secondHopPRB #2=0. The starting PRB of the third PUCCH transmission is 99, and PUCCH 732 is moved to PUCCH 734.

In some arrangements, the first set of frequency hopping configuration is indicated to the UE, which can be denoted as {startingPRB #1, secondHopPRB #1}. The second set of frequency hopping configuration is an offset for the first hop for the frequency portion in t3, which can be denoted as offset #1. For example, the base station indicates startingPRB #1=49, secondHopPRB #1=0 and offset #1=50. The starting PRB of the third PUCCH transmission is 99 (startingPRB #1+offset #1), and PUCCH 732 is moved to PUCCH 734.

In some arrangements, the first set of frequency hopping configuration containing starting PRB of the first hop and the second hop, which can be denoted as {startingPRB #1, secondHopPRB #1}, is indicated to the UE. The second set of frequency hopping configuration contains two offsets for the first hop and second hop for the frequency portion in t3, respectively, which can be denoted as offset #1 and offset #2. For example, the base station indicates startingPRB #1=49, secondHopPRB #1=10, offset #1=50 and offset #1=−10. The starting PRB of the third PUCCH transmission is 99 (startingPRB #1+offset #1), and PUCCH 732 is moved to PUCCH 734. The starting PRB of the fourth PUCCH transmission is 0 (secondHopPRB #1+offset #2).

In existing wireless communication systems, for Dynamic Grant (DG)-PUSCH, the base station configures via RRC a list of frequency hopping offsets and indicates via DCI one of the offsets for UE. UE determines the frequency-domain starting position (e.g., starting RB) of the PUSCH based on the indicated offset via:

$$RB_{start} = \begin{cases} RB_{start} & i = 0 \\ (RB_{start} + RB_{offset}) \bmod N_{BWP}^{size} & i = 1 \end{cases}, \quad (20)$$

where $RB_{start}$ is the starting RB of the PUSCH within the uplink BWP indicated by the frequency resource allocation indicator in the DCI scheduling the PUSCH, and $RB_{offset}$ is the frequency hopping offset indicated by the DCI.

$$N_{BWP}^{size}$$

is the size of the UL BWP. In addition, i=0 refers the first hop, and i=1 refers to the second hop. For the CG-PUSCH, the frequency hopping offset $RB_{offset}$ can be configured by RRC.

In some arrangements, the at least one frequency hopping configuration set includes a plurality of frequency hopping configuration sets. Each of the plurality of frequency hopping configuration sets includes a plurality of offsets. Determining the frequency hopping configuration set for the transmission in each of the plurality of time-domain resources includes receiving, by the UE 204 from the network, an index of the frequency hopping configuration set, and determining the frequency hopping configuration set based on the index. The frequency-domain starting position for the transmission in each of the plurality of time-domain resources is determined based on the plurality of offsets in the frequency hopping configuration set and a number (e.g., N) of the plurality of offsets in the frequency hopping configuration set. In some arrangements, the network (e.g., the base station) configures M sets of frequency hopping configurations for the UE. Each set of frequency hopping configuration contains N offsets, e.g., $\{O_0, O_1 \ldots O_{N-1}\}$. The offset can be positive value, negative value, or zero.

In some arrangements, the network (e.g., the base station) indicates to the UE an index m used by the UE to determine the set of frequency hopping configurations from the configured M sets of frequency hopping configurations. The index can be indicated using the DCI scheduling the corresponding PUSCH. If the N offsets that can be indicated by the index m are $\{O_0, O_1 \ldots O_{N-1}\}$, the UE uses the offset $O_{l \bmod N}$ for PUSCH transmission in time-domain resource l (e.g., slot l or sub-slot l) to determine the starting frequency-domain position (e.g., starting RB) of the PUSCH with:

$$RB_{start,l} = \begin{cases} RB_{start} & i = 0 \\ (RB_{start} + O_{l \bmod N}) \bmod N_{BWP}^{size} & i = 1 \end{cases}; \quad (21)$$

or $$RB_{start,l} = \begin{cases} RB_{start} & i = 1 \\ (RB_{start} + O_{l \bmod N}) \bmod N_{BWP}^{size} & i = 0 \end{cases}, \quad (22)$$

where M and N are integer number that is larger than 1.

In some arrangements, the network (e.g., a base station) indicates an index offset j via DCI to the UE for the UE to determine the offset used for frequency hopping. In this case, the UE uses the offset $O_{(l+j) \bmod N}$ for PUSCH transmission in time-domain resource l (e.g., slot l or sub-slot l) to determine the frequency-domain starting position (e.g., the starting RB) of PUSCH with the following:

$$RB_{start,l} = \begin{cases} RB_{start} & i = 0 \\ (RB_{start} + O_{(l+j)\,mod\,N}) \bmod N_{BWP}^{size} & i = 1 \end{cases}; \quad (23)$$

or $$RB_{start,l} = \begin{cases} RB_{start} & i = 1 \\ (RB_{start} + O_{(l+j)\,mod\,N}) \bmod N_{BWP}^{size} & i = 0 \end{cases}. \quad (24)$$

where the index offset j=0, 1 . . . N−1. In the example in which the network does not indicate any index offset j to the UE or if the value of the index offset j is set to null, the UE determines that the index offset j is equal to 0 by default.

In some arrangements, the at least one frequency hopping configuration set includes a plurality of frequency hopping configuration sets. Each of the plurality of frequency hopping configuration sets comprises a plurality of pairs of offsets, each of the plurality of pairs of offset comprises a first offset for a first hop and a second offset for a second hop. Determining the frequency hopping configuration set for the transmission in each of the plurality of time-domain resources includes receiving, by the UE 2-4 from the network, an index of the frequency hopping configuration set, and determining the frequency hopping configuration set based on the index. The frequency-domain starting position for the transmission in each of the plurality of time-domain resources is determined based on the first offset and the second offset of one of the plurality of pairs of offsets in the frequency hopping configuration set and a number (e.g., N) of the plurality of offsets in the frequency hopping configuration set. In some arrangements, the network (e.g., the base station) configures M sets of frequency hopping configurations for the UE. Each set of frequency hopping configuration contains N pairs of offsets. Each pair of offsets contains two offsets, a first offset for the first hop and a second offset for the second hop. The offset can be positive value, negative value, or zero.

In some arrangements, the network (e.g., the base station) indicates to the UE an index m used by the UE to determine the set of frequency hopping configurations from the configured M sets of frequency hopping configurations. The index can be indicated using the DCI scheduling the corresponding PUSCH. If the N pairs of offsets that can be indicated by the index m are $\{O_0, O_1 \ldots O_{N-1}\}$ for the first hop and $\{O2_0, O2_1 \ldots O2_{N-1}\}$ for the second hop, the UE uses the offset $\mathbf{O1}_{l\ mod\ N}$ and $\mathbf{O2}_{l\ mod\ N}$ for PUSCH transmission in time-domain resource l (e.g., slot l or sub-slot l) to determine the starting frequency-domain position (e.g., starting RB) of the PUSCH with:

$$RB_{start,l} = \begin{cases} (RB_{start} + O1_{l\,mod\,N}) \bmod N_{BWP}^{size} & i = 0 \\ (RB_{start} + O2_{l\,mod\,N}) \bmod N_{BWP}^{size} & i = 1 \end{cases}, \quad (25)$$

where M and N are integer number that is larger than 1.

An index offset j can be indicated by DCI to the UE to determine the offsets used for frequency hopping. In this case, UE uses the offset $\mathbf{O1}_{(l+j)mod\ N}$ and $\mathbf{O2}_{(l+j)mod\ N}$ for PUSCH transmission in time-domain resource l (e.g., slot l or sub-slot l) to determine the frequency-domain starting position (e.g., the starting RB) of PUSCH with the following equation.

$$RB_{start,l} = \begin{cases} (RB_{start} + O1_{(l+j)\,mod\,N}) \bmod N_{BWP}^{size} & i = 0 \\ (RB_{start} + O2_{(l+j)\,mod\,N}) \bmod N_{BWP}^{size} & i = 1 \end{cases}, \quad (26)$$

where the index offset j=0, 1 . . . N−1. In the example in which the network does not indicate any index offset j to the UE or if the value of the index offset j is set to null, the UE determines that the index offset j is equal to 0 by default.

In some arrangements, the at least one frequency hopping configuration set comprises a plurality of frequency hopping configuration sets. Each of the plurality of frequency hopping configuration sets includes a plurality of offsets. Determining the frequency hopping configuration set for the transmission in each of the plurality of time-domain resources includes receiving, by the UE from the network, an index of the frequency hopping configuration set, and determining the frequency hopping configuration set based on the index. The frequency-domain starting position for the transmission in each of the plurality of time-domain resources is determined based on one of the plurality of offsets in the frequency hopping configuration set that is mapped to an uplink frequency portion corresponding to each of the plurality of time-domain resources. In some arrangements, the network the network (e.g., the base station) configures M sets of frequency hopping configurations for the UE. Each set of frequency hopping configuration contains N offsets, e.g., $\{O_0, O_1 \ldots O_{N-1}\}$. The offset can be positive value, negative value, or zero.

In some arrangements, the network (e.g., the base station) indicates to the UE an index m used by the UE to determine the set of frequency hopping configurations from the configured M sets of frequency hopping configurations. The index can be indicated using the DCI scheduling the corresponding PUSCH. If the N offsets that can be indicated by the index m are $\{O_0, O_1 \ldots O_{N-1}\}$, the UE uses the offset $O_{F_l}$ for PUSCH transmission in time-domain resource l (e.g., slot l or sub-slot l) to determine the starting frequency-domain position (e.g., starting RB) of the PUSCH with:

$$RB_{start,l} = \begin{cases} RB_{start} & i = 0 \\ (RB_{start} + O_{F_l}) \bmod N_{BWP}^{size} & i = 1 \end{cases}; \quad (27)$$

or $$RB_{start,l} = \begin{cases} RB_{start} & i = 1 \\ (RB_{start} + O_{F_l}) \bmod N_{BWP}^{size} & i = 0 \end{cases}. \quad (28)$$

$F_l$ is the uplink frequency portion corresponding to time-domain resource l (e.g., slot l or sub-slot l). $O_{F_l}$ is the offset mapped to uplink frequency portion $F_l$. M and N are integer number that is larger than 1.

In some arrangements, the at least one frequency hopping configuration set comprises a plurality of frequency hopping configuration sets. Each of the plurality of frequency hopping configuration sets comprises a plurality of pairs of offsets. Each of the plurality of pairs of offset includes a first offset for a first hop and a second offset for a second hop. Determining the frequency hopping configuration set for the transmission in each of the plurality of time-domain resources includes receiving, by the UE 204 from the network, an index of the frequency hopping configuration set, and determining the frequency hopping configuration set based on the index. The frequency-domain starting position for the transmission in each of the plurality of time-domain resources is determined based on the first offset and the second offset of one of the plurality of pairs of offsets in the frequency hopping configuration set that are mapped to a frequency portion corresponding to each of the plurality of time-domain resources. In some arrangements, the network (e.g., the base station) configures M sets of frequency hopping configurations for the UE. Each set of frequency hopping configuration contains N pairs of offsets. Each pair of offsets contains two offsets, a first offset for the first hop and a second offset for the second hop. The offset can be positive value, negative value, or zero. Each pair of offsets is mapped with an uplink frequency portion.

In some arrangements, the network (e.g., the base station) indicates to the UE an index m used by the UE to determine the set of frequency hopping configurations from the configured M sets of frequency hopping configurations. The index can be indicated using the DCI scheduling the corresponding PUSCH. If the N pairs of offsets that can be indicated by the index m are $\{O_0, O_1 \ldots O_{N-1}\}$ for the first hop and $\{O2_0, O2_1 \ldots O2_{N-1}\}$ for the second hop, the UE uses the offset $O1_{F_l}$ and $O2_{F_l}$ for PUSCH transmission in time-domain resource l (e.g., slot l or sub-slot l) to determine the starting frequency-domain position (e.g., starting RB) of the PUSCH with:

$$RB_{start,l} = \begin{cases} \left(RB_{start} + O1_{F_l}\right) \bmod N_{BWP}^{size} & i = 0 \\ \left(RB_{start} + O2_{F_l}\right) \bmod N_{BWP}^{size} & i = 1 \end{cases}, \tag{29}$$

$F_l$ is the uplink frequency portion corresponding to time-domain resource l (e.g., slot l or sub-slot l). $O1_{F_l}$ and $O2_{F_l}$ are the pair of offsets mapped to uplink frequency portion $F_l$. M and N are integer number that is larger than 1.

Figure 8:
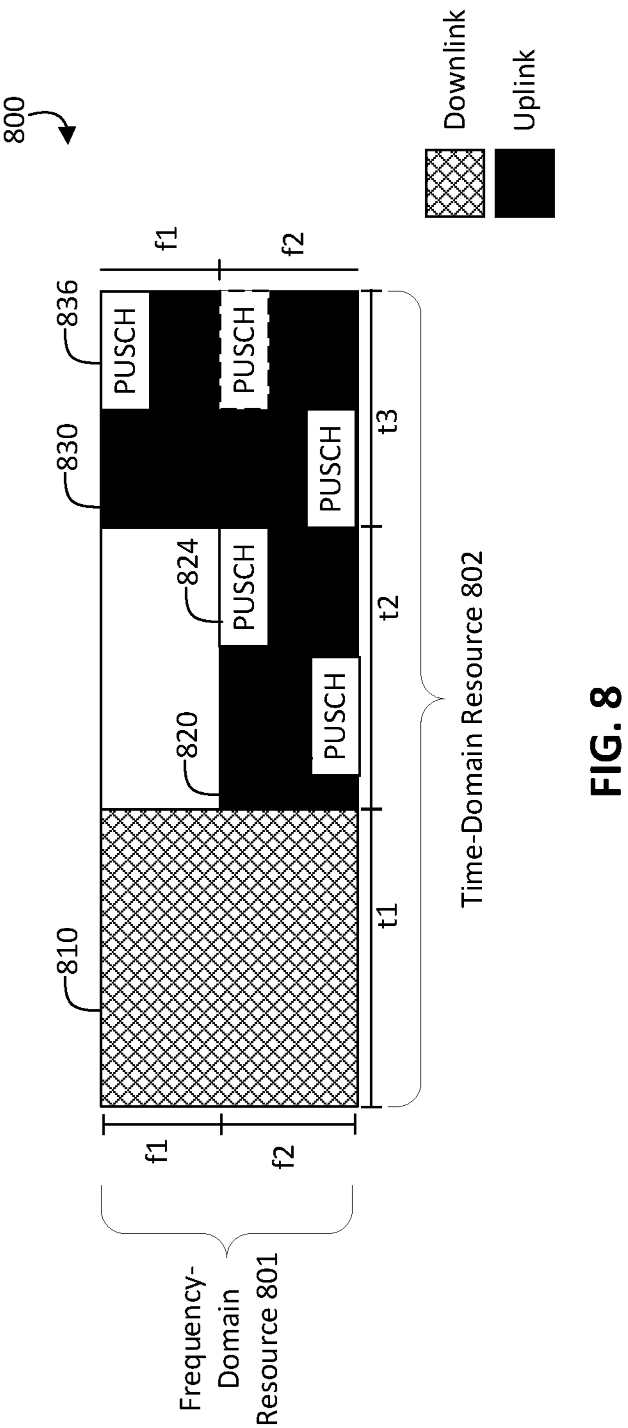
FIG. 8 is a diagram illustrating example time-frequency-domain resource, according to various arrangements.

In some arrangements, FIG. 8 is a diagram illustrating example time-frequency-domain resource 800. As shown in FIG. 8, the time-frequency-domain resource 800 includes a frequency-domain resource 801 (y-axis) and a time-domain resource 802 (x-axis). The frequency-domain resource 801 includes first frequency portion f1 and second frequency portion f2. The time-domain resource 802 includes first time-domain portion t1, second time-domain portion t2, and third time-domain portion t3. The time-frequency-domain resource 800 includes a first time-frequency-domain resource 810 (including portions t1, f1, and f2), a second time-frequency-domain resource 820 (including portions t2 and f2), and a third time-frequency-domain resource 830 (including portions t2, f1, and f2). The first time-frequency-domain resource 810 is for downlink transmissions. The time-frequency-domain resources 820 and 830 are for downlink transmissions.

The uplink frequency portion in t2 contains frequency resource portion f2, and the uplink frequency portion in t3 contains frequency resource portions f1 and f2. In legacy PUSCH frequency hopping transmission scheme, four PUSCH transmissions PUSCH 822, PUSCH 824, PUSCH 832, and PUSCH 834 with frequency hopping are transmitted using different frequency portions. For example, the frequency portion corresponding to PUSCH 822 and PUSCH 824 is the first uplink frequency portion f2, and the frequency portion corresponding to PUSCH 832 and PUSCH 834 is the second uplink frequency portion that includes f1 and f2. PUSCH 822 and PUSCH 832 are the first hop. PUSCH 824 and PUSCH 836 (or PUSCH 834) are the second hop.

Figures 9, 10:
FIG. 9 is a table illustrating sets of frequency hopping configurations, in some arrangements.
FIG. 10 is a table illustrating sets of frequency hopping configurations, in some arrangements.

FIG. 9 is a table 900 illustrating sets of frequency hopping configurations, in some arrangements. As shown in FIG. 9, four sets of frequency hopping configurations are indicated to the UE. Each frequency hopping configuration set contains 2 offsets, and each offset corresponds to one frequency portion. For example, the network indicates RRC indicates the information contained in the table 900 to the UE. For example, the network can indicate the index corresponding to the set, and the UE can determine the set that corresponds to the index. In some examples, $O_0$ is the offset for the uplink frequency portion in t2, and $O_1$ is the offset for uplink frequency portion in t3.

DCI indicates that index 0 is used to calculate the frequency resource for PUSCH transmission. If the starting RB indicated by the frequency resource allocation indicator by the DCI is 0, then according to expression (21), the starting RB for PUSCH 822 and PUSCH 832 is 0, and the starting RB for PUSCH 824 is 40. The fourth PUSCH transmission is PUSCH 836, the starting RB of which is 90.

FIG. 10 is a table 1000 illustrating sets of frequency hopping configurations, in some arrangements. As shown in FIG. 10, four sets of frequency hopping configurations are indicated to the UE. Each set of frequency hopping configurations contains two pairs of offsets. Each pair of offsets contains two offsets and corresponds to one frequency portion. For example, the network can indicate to the UE using RRC the information contained in the table 1000. For example, the network can indicate the index corresponding to the set, and the UE can determine the set that corresponds to the index.

The first pair of offsets is for frequency portion in t2 and the second pair of offsets is for frequency portion in t3. In some examples, the DCI indicates that index 0 is used to calculate the frequency resource for PUSCH transmission. If the starting RB indicated by the frequency resource allocation indicator by the DCI is 0, then according to expression (29), the starting RB for PUSCH 822 and PUSCH 832 is 0. The starting RB for PUSCH 824 is 40. The fourth PUSCH transmission is PUSCH 836, of which the starting RB is 90.

In some arrangements, the network (e.g., a base station) indicates M bandwidths for UE, where each bandwidth corresponds to one frequency portion. M is integer number larger than zero. The frequency resource allocation of PDSCH or PUSCH is based on the bandwidth of each frequency portion. For RBG based frequency resource allocation, the RBG allocation for PDSCH or PUSCH is based on the bandwidth of each frequency portion. For the PUSCH or PUCCH frequency resource allocation with interlace, the interlace determination is based on the bandwidth of each frequency portion.

In some examples, the bandwidth for uplink frequency portion in t2 of FIG. 8 is 50 RBs. The bandwidth for uplink frequency portion in t3 is 100 RBs. 50 RBs are used to determine the RBG allocation for PUSCH transmission in t2 and 100 RBs are used to determine the RBG allocation for PUSCH transmission in t3.

While various arrangements of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein.

Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the arrangements described in this disclosure will be readily apparent to those skilled in the art, and the general principles defined herein can be applied to other arrangements without departing from the scope of this disclosure. Thus, the disclosure is not intended to be limited to the arrangements shown herein, but is to be accorded the widest scope consistent with the novel features and principles disclosed herein, as recited in the claims below.

The invention claimed is:

1. A method, comprising:

receiving, by a wireless communication device from a network, a plurality of frequency hopping configuration sets for a transmission, wherein each of the plurality of frequency hopping configuration sets comprises a plurality of offsets;

determining, by the wireless communication device from the network, a plurality of time-domain resources for repeating the transmission or for multiple transmissions scheduled by a single scheduling command; and determining, by the wireless communication device, a frequency hopping configuration set from the plurality of frequency hopping configuration sets for the transmission in each of the plurality of time-domain resources by:

receiving, by the wireless communication device from the network, an index of the frequency hopping configuration set;

determining, by the wireless communication device, the frequency hopping configuration set based on the index; and determining, by the wireless communication device, a frequency-domain starting position for the transmission in each of the plurality of time-domain resources based on a respective one of the plurality of offsets in the determined frequency hopping configuration set that is mapped to an uplink frequency portion corresponding to a respective one of the plurality of time-domain resources.

2. The method of claim 1, wherein each of the plurality of time-domain resource comprises a slot, a sub-slot, a frame, or a subframe; and the transmission is one of an uplink transmission or a downlink transmission.

3. The method of claim 1, wherein the plurality of frequency hopping configuration sets is mapped to uplink frequency portions via a first mapping;

the uplink frequency portions are mapped to the plurality of time-domain resources via a second mapping; and the frequency hopping configuration set for the transmission in each of the plurality of time-domain resources is determined using the first mapping and the second mapping.

4. A wireless communication device, comprising:

at least one processor configured to:

receive, via a receiver from a network, a plurality of frequency hopping configuration sets for a transmission, wherein each of the plurality of frequency hopping configuration sets comprises a plurality of offsets;

determine, from the network, a plurality of time-domain resources for repeating the transmission or for multiple transmissions scheduled by a single scheduling command; and determine frequency hopping configuration set from the plurality of frequency hopping configuration sets for the transmission in each of the plurality of time-domain resources by:

receiving, via the receiver from the network, an index of the frequency hopping configuration set;

determining the frequency hopping configuration set based on the index; and determining a frequency-domain starting position for the transmission in each of the plurality of time-domain resources based on a respective one of the plurality of offsets in the determined frequency hopping configuration set that is mapped to an uplink frequency portion corresponding to a respective one of the plurality of time-domain resources.

5. A network node, comprising:

at least one processor configured to:

send, via a transceiver to a wireless communication device, a plurality of frequency hopping configuration sets for a transmission, wherein each of the plurality of frequency hopping configuration sets comprises a plurality of offsets;

communicate, via the transceiver with the wireless communication device, the transmission and at least one repetition thereof or multiple transmissions scheduled by a single scheduling command using a plurality of time-domain resources and a frequency hopping configuration set from the plurality of frequency hopping configuration sets for the transmission in each of the plurality of time-domain resources, wherein the plurality of time-domain resources for repeating the transmission or for the multiple transmissions scheduled by the single scheduling command is determined by the wireless communication device; and the frequency hopping configuration set from the plurality of frequency hopping configuration sets for the transmission in each of the plurality of time-domain resources is determined by the wireless communication device by:

receiving, via a receiver from the network node, an index of the frequency hopping configuration set, determining the frequency hopping configuration set based on the index, and determining a frequency-domain starting position for the transmission in each of the plurality of time-domain resources based on a respective one of the plurality of offsets in the determined frequency hopping configuration set that is mapped to an uplink frequency portion corresponding to a respective one of the plurality of time-domain resources.

6. A method, comprising:

sending, by a transceiver of a network to a wireless communication device, a plurality of frequency hopping configuration sets for a transmission, wherein each of the plurality of frequency hopping configuration sets comprises a plurality of offsets;

communicating, by the network with the wireless communication device, the transmission and at least one repetition thereof or multiple transmissions scheduled by a single scheduling command using a plurality of time-domain resources and a frequency hopping configuration set from the plurality of frequency hopping configuration sets for the transmission in each of the plurality of time-domain resources, wherein the plurality of time-domain resources for repeating the transmission or for the multiple transmissions scheduled by the single scheduling command is determined by the wireless communication device; and the frequency hopping configuration set from the plurality of frequency hopping configuration sets for the transmission in each of the plurality of time-domain resources is determined by the wireless communication device by:

receiving, via a receiver from the network, an index of the frequency hopping configuration set, determining the frequency hopping configuration set based on the index, and determining a frequency-domain starting position for the transmission in each of the plurality of time-domain resources based on a respective one of the plurality of offsets in the determined frequency hopping configuration set that is mapped to an uplink frequency portion corresponding to a respective one of the plurality of time-domain resources.

* * * * *